(12) United States Patent
Zhan et al.

(10) Patent No.: US 11,953,244 B2
(45) Date of Patent: Apr. 9, 2024

(54) ELECTRONIC EXPANSION VALVE

(71) Applicant: ZHEJIANG DUNAN ARTIFICIAL ENVIRONMENT CO., LTD., Zhejiang (CN)

(72) Inventors: Shaojun Zhan, Zhejiang (CN); Guigang Feng, Zhejiang (CN); Qiubo He, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 324 days.

(21) Appl. No.: 17/606,765

(22) PCT Filed: Apr. 23, 2020

(86) PCT No.: PCT/CN2020/086493
§ 371 (c)(1),
(2) Date: Oct. 27, 2021

(87) PCT Pub. No.: WO2020/233338
PCT Pub. Date: Nov. 26, 2020

(65) Prior Publication Data
US 2022/0205694 A1    Jun. 30, 2022

(30) Foreign Application Priority Data
May 20, 2019    (CN) .......................... 201910419984.X

(51) Int. Cl.
| F25B 41/35 | (2021.01) |
| F16K 1/04 | (2006.01) |
| F16K 1/36 | (2006.01) |

(52) U.S. Cl.
CPC .............. *F25B 41/35* (2021.01); *F16K 1/04* (2013.01); *F16K 1/36* (2013.01)

(58) Field of Classification Search
CPC ... F25B 41/35; F16K 1/04; F16K 1/36; F16K 1/46; F16K 17/04; F16K 31/50
See application file for complete search history.

(56) References Cited

FOREIGN PATENT DOCUMENTS

| CN | 207470790 U | * | 6/2018 |
| CN | 207470790 U |  | 6/2018 |
| CN | 108343749 A |  | 7/2018 |
| CN | 109323006 A |  | 2/2019 |
| CN | 109708343 A |  | 5/2019 |
| CN | 210123017 U |  | 3/2020 |

(Continued)

*Primary Examiner* — Lionel Nouketcha
(74) *Attorney, Agent, or Firm* — Samson G. Yu

(57) ABSTRACT

Some embodiments of the present disclosure provide an electronic expansion valve, including: a valve body, the valve body having a valve port; a valve head portion, movably provided in the valve body, the valve head portion including a valve head and a pressing sleeve, the valve head having an accommodating cavity, the end of the accommodating cavity close to the valve port having a bottom wall, a through hole being provided on the bottom wall, and the valve head being used for blocking the valve port; a guide sleeve, provided in the valve body, the valve head portion being inserted in the guide sleeve; a driving portion, movably provided in the valve body, an end of the driving portion penetrating the pressing sleeve, and a channel being provided on the end of the driving portion.

18 Claims, 3 Drawing Sheets

(56) References Cited

FOREIGN PATENT DOCUMENTS

| | | |
|---|---|---|
| EP | 3273186 A1 | 1/2018 |
| JP | 5881277 A | 5/1983 |
| WO | 2018137636 A1 | 8/2018 |
| WO | 2019091484 A1 | 5/2019 |

* cited by examiner

ELECTRONIC EXPANSION VALVE

CROSS-REFERENCE TO RELATED APPLICATIONS

The present disclosure is a national stage application of International Patent Application No. PCT/CN2020/086493, which is filed on Apr. 23, 2020, and claims priority to Chinese Patent Application No. 201910419984.X, filed on May 20, 2019 and entitled "Electronic Expansion Valve", the contents of which are hereby incorporated by reference in its entirety.

TECHNICAL FIELD

The present disclosure relates to a technical field of valves, and in particular, to an electronic expansion valve.

BACKGROUND

In the existing electronic expansion valve, a connection structure between a valve head and a screw rod is complex, and therefore a processing procedure is complex and a manufacturing cost is high; and the valve head and the screw rod both have a relatively long size, and cannot be thinner and slimmer so as to guarantee the service life and strength of the product, and therefore, a whole size of a current electronic expansion valve cannot be further compressed, which does not conform to a trend of product miniaturization.

SUMMARY

Some embodiments of the present disclosure provide an electronic expansion valve to solve the problems of high manufacturing costs and large size of the electronic expansion valve in the art known to inventors.

In order to solve the described problems, some embodiments of the present disclosure provide an electronic expansion valve, including: a valve body, the valve body having a valve port; a valve head portion, movably provided in the valve body, the valve head portion comprising a valve head and a pressing sleeve, the valve head having an accommodating cavity, an end of the accommodating cavity close to the valve port having a bottom wall, a through hole being provided on the bottom wall, and the valve head being used for blocking the valve port; a guide sleeve, provided in the valve body, the valve head portion being inserted in the guide sleeve; a driving portion, movably provided in the valve body, an end of the driving portion penetrating the pressing sleeve, and a channel being provided on the end of the driving portion and the pressing sleeve, the channel, the accommodating cavity and the through hole together forming a balancing channel penetrating the valve head portion; an elastic member, provided in the accommodating cavity, one end of the elastic member being cooperated with the bottom wall, and the other end of the elastic member being able to be compressed by the end of the driving portion; and a sealing member, the sealing member being provided between the valve head portion and the guide sleeve.

In some embodiments, the driving portion comprises a rod and a valve sleeve, the rod is axially movable, an end of the rod is connected to the valve sleeve, the valve sleeve is cooperated with an end of the valve head portion away from the valve port, and the other end of the elastic member is abutted against the valve sleeve.

In some embodiments, the valve sleeve is fixed at the end of the rod, the outer circumferential surface of the valve sleeve has a first limiting step, and the other end of the elastic member is abutted the first limiting step.

In some embodiments, an end of the valve head away from the valve port is provided with an opening, the opening is in communication with the accommodating cavity, the pressing sleeve is provided at the opening, and the valve sleeve is abutted against the pressing sleeve.

In some embodiments, the rod passes through the pressing sleeve, an outer circumferential surface of the pressing sleeve has a second limiting step, a part of the pressing sleeve is inserted into the accommodating cavity, and an end face of the valve head is abutted against the second limiting step.

In some embodiments, a first avoiding hole is provided between the inner wall of the valve sleeve and the rod, a second avoiding hole is provided between the inner wall of the pressing sleeve and the rod, a channel is formed by the first avoiding hole and the second avoiding hole, and the through hole, the accommodating cavity, the first avoiding hole and the second avoiding hole are communicated sequentially.

In some embodiments, the rod comprises a first rod section and a second rod section connected with each other, a cross-sectional area of the second rod section is less than a cross-sectional area of the first rod section, the second rod section is disposed into the pressing sleeve and the valve sleeve in a penetration manner, the first avoiding hole is provided between the second rod section and the inner wall of the valve sleeve, and the second avoiding hole is provided between the second rod section and the inner wall of the pressing sleeve In some embodiments, the second rod section has a radial cross-section, and the radial cross-section is arcuate.

In some embodiments, the driving portion has an external thread, and the electronic expansion valve further comprises a nut assembly, the nut assembly having an internal thread, the external thread being fitted with the internal thread.

In some embodiments, a length of the end of the driving portion that is inserted into the valve head portion is less than or equal to a half of a length of the valve head portion.

By applying the technical solution of the present disclosure, a driving portion can be used to drive a valve head portion to move, so as to block or open a valve port by means of a valve head, and an acting force can be applied to the valve head by means of an elastic member, so as to improve the sealing performance when blocking the valve port. As an end of the driving portion is cooperated with the end of the valve head portion away from the valve port, and the elastic member is located between the end of the driving portion and the bottom wall of the accommodating cavity of the valve head portion, the lengths of the valve head portion and the driving portion can be reduced, and the structure can be simplified, thereby simplifying the machining procedure, reducing the machining difficulty, and reducing the manufacturing cost of the electronic expansion valve. Furthermore, by means of the channel formed by the end of the driving portion and the cavity in the pressing sleeve together, the accommodating cavity and the through hole of the valve head, a balancing channel penetrating through the valve head portion is formed, so that pressure balance can be maintained in the regions at the two ends of the valve head portion, and the size of the product can be made smaller. The valve head can be guided by the guide sleeve, and the sealing performance can be improved by the sealing member to avoid internal leakage.

BRIEF DESCRIPTION OF THE DRAWINGS

The accompanying drawings, which form a part of the present disclosure, are used for providing a further understanding of the present disclosure. The schematic embodiments of the present disclosure and the illustrations thereof are used for explaining the present disclosure, and do not form improper limits to the present disclosure. In the drawings.

The figures include the following reference signs:
10. valve body; 11. valve port; 21. valve head; 211. through hole; 22. pressing sleeve; 221. second avoiding hole; 31. rod; 311. first rod section; 312. second rod section; 32. valve sleeve; 321. first avoiding hole; 40. elastic member; 50. nut assembly; 60. guide sleeve; 71. first cavity; 72. second cavity; 80. sealing member.

DETAILED DESCRIPTION OF THE EMBODIMENTS

The following clearly and completely describes the technical solutions in the embodiments of the present disclosure with reference to the accompanying drawings in the embodiments of the present disclosure. Obviously, the embodiments to be described are only a part rather than all of the embodiments of the present disclosure. The following description for at least one exemplary embodiment is merely illustrative in nature and is in no way intended to limit the present disclosure and the disclosure or use thereof. All other embodiments obtained by a person of ordinary skill in the art based on the embodiments of the present disclosure without inventive efforts shall belong to the scope of protection of the present disclosure.

Figure 1:
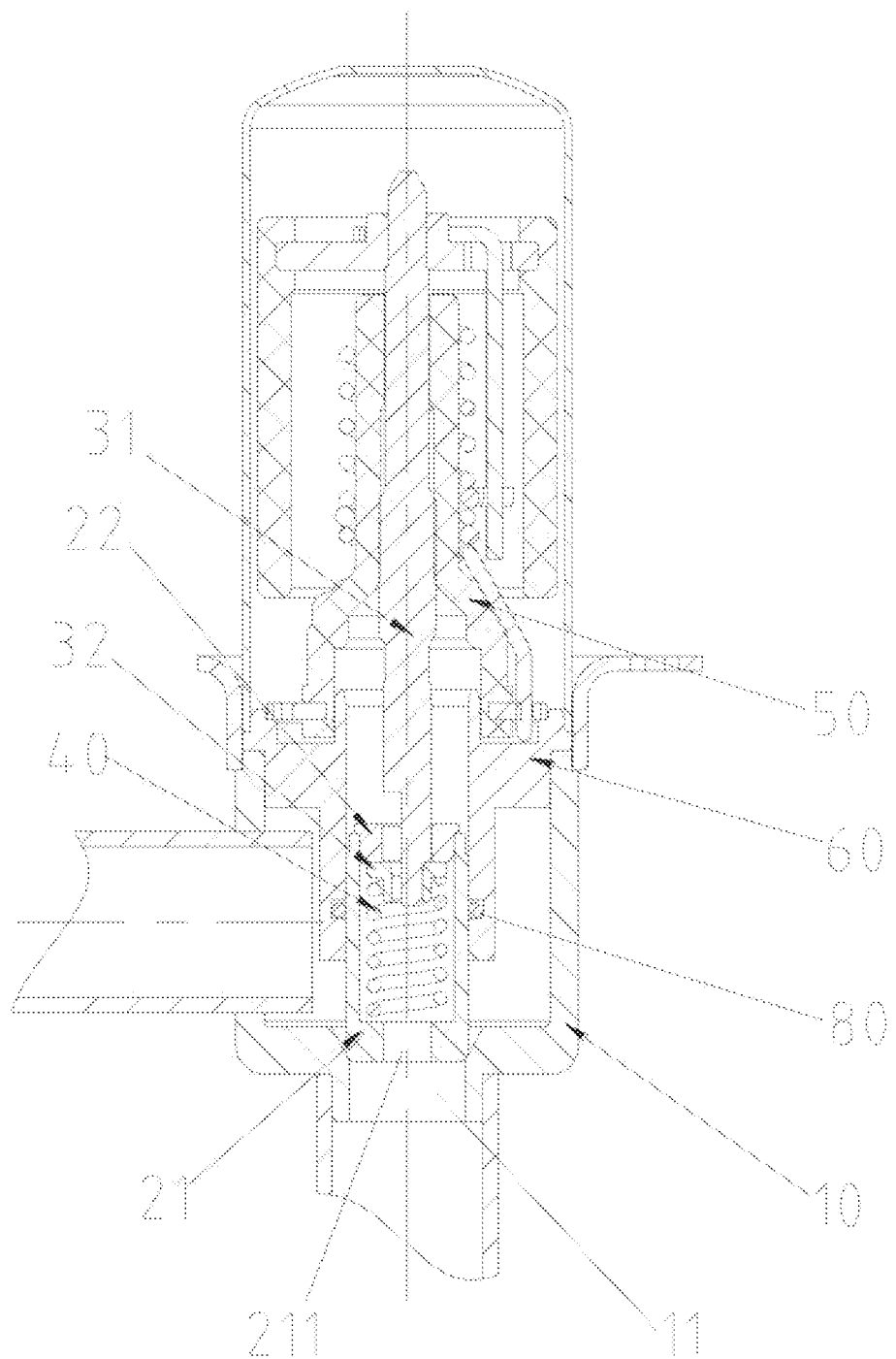
FIG. 1 illustrates a sectional view of an electronic expansion valve provided by the embodiments of the present disclosure.
Figure 2:
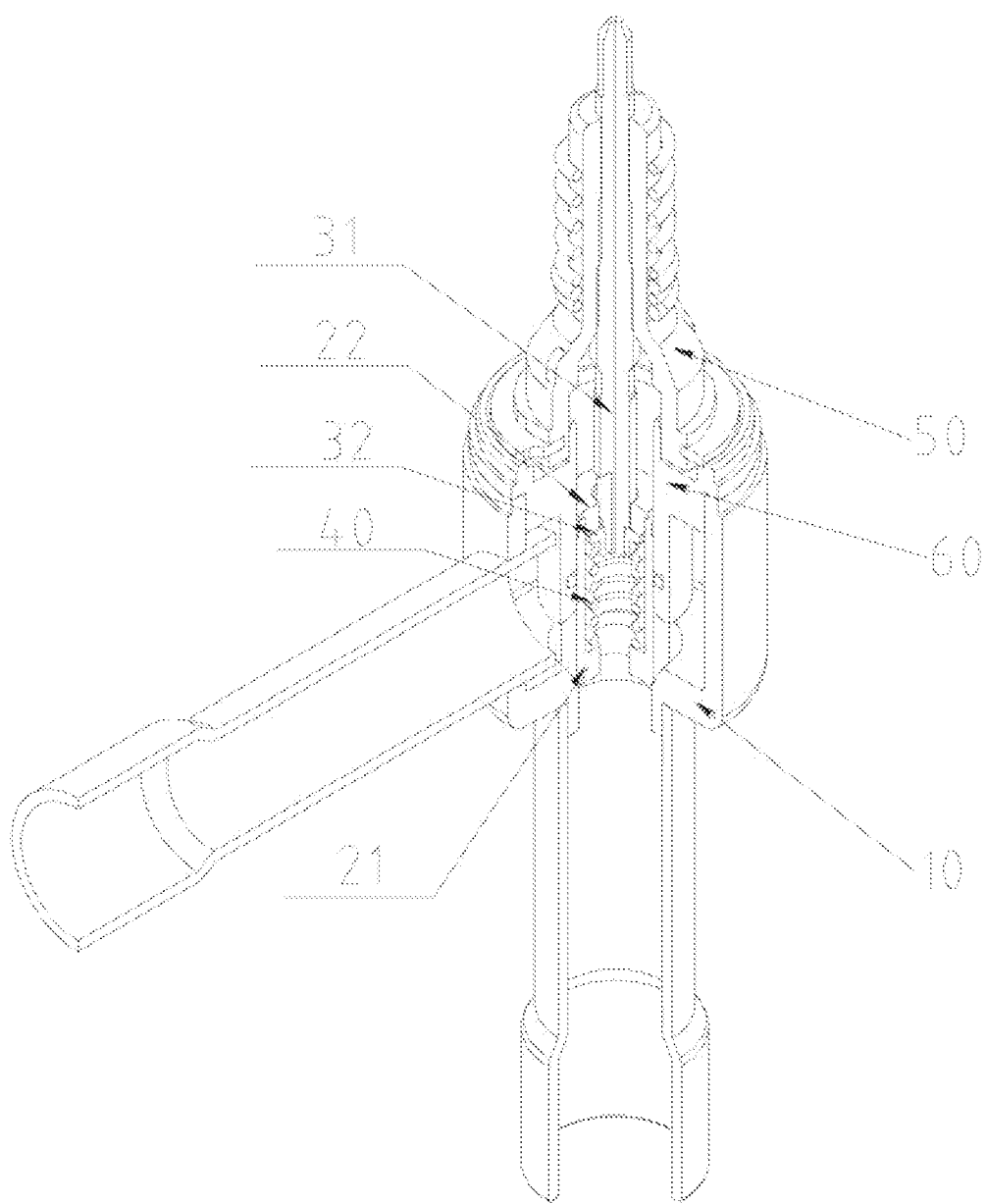
FIG. 2 illustrates a perspective view of the electronic expansion valve in FIG. 1.
Figure 3:
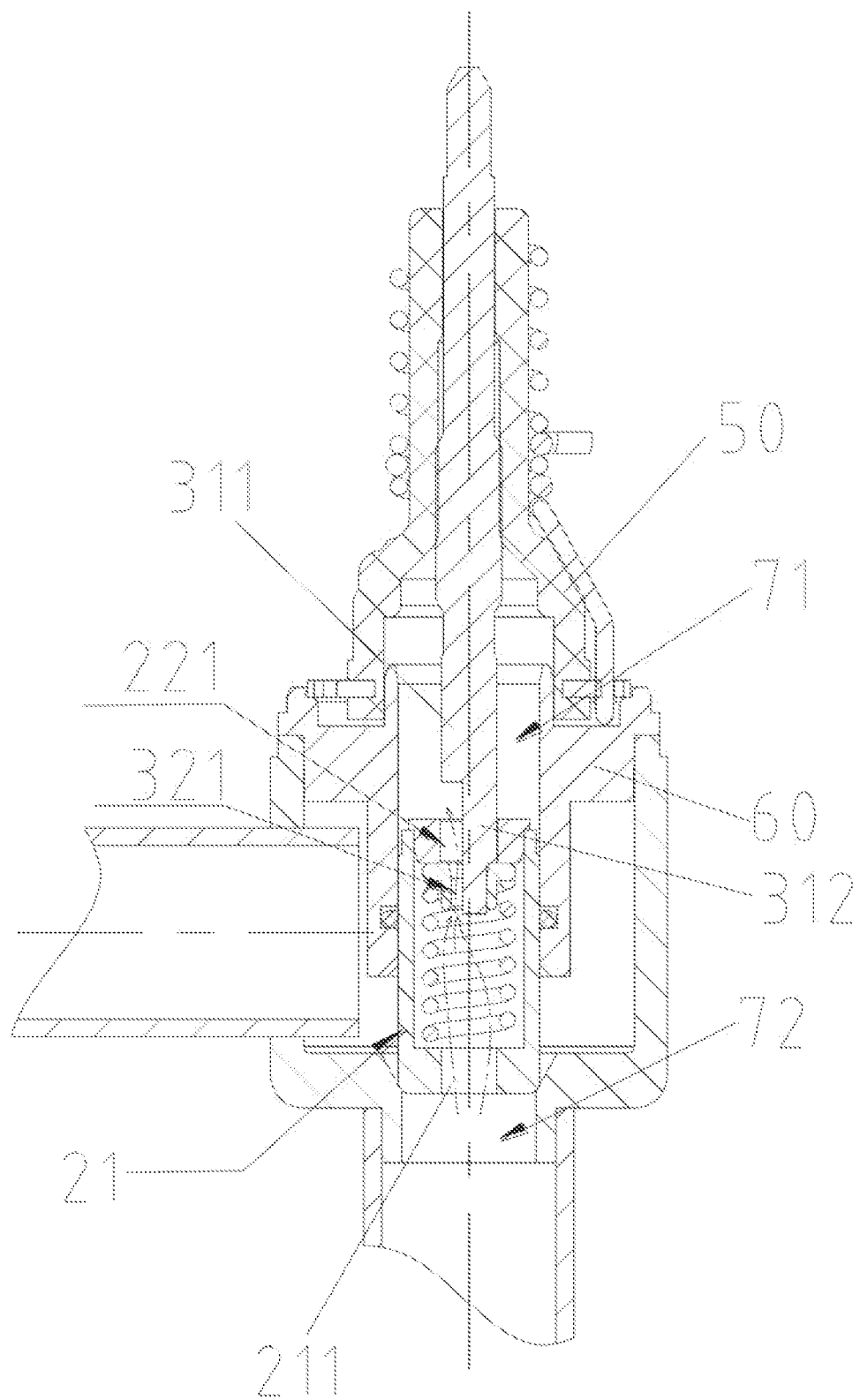
FIG. 3 illustrates a schematic diagram of the structure of a part of the components in FIG. 1.

As shown in FIG. 1 to FIG. 3, the embodiments of the present disclosure provide an electronic expansion valve, including: a valve body 10, the valve body 10 having a valve port 11; a valve head portion, movably provided in the valve body 10, the valve head portion including a valve head 21 and a pressing sleeve 22, the valve head 21 having an accommodating cavity, an end of the accommodating cavity close to the valve port 11 having a bottom wall, a through hole 211 being provided on the bottom wall, and the valve head 21 being used for blocking the valve port 11; a driving portion, movably provided in the valve body 10, an end of the driving portion passing through the pressing sleeve 22, a channel being provided on the end of the driving portion and the pressing sleeve 22, the channel, the accommodating cavity and the through hole 211 together forming a balancing channel penetrating the valve head portion; and an elastic member 40 provided in the accommodating cavity, one end of the elastic member 40 being cooperated with the bottom wall, and the other end of the elastic member 40 being able to being compressed by the end of the driving portion.

By applying the technical solution of the embodiments, the valve head portion can be driven to move by the driving portion, so as to block or open the valve port 11 of the valve body 10 by means of the valve head 21, and an acting force can be applied to the valve head portion by means of the elastic member 40, so as to improve the sealing performance when blocking the valve port. As the end of the driving portion is cooperated with the end of the valve head portion away from the valve port 11, and the elastic member 40 is located between the end of the driving portion and the bottom wall of the accommodating cavity of the valve head portion, the lengths of the valve head portion and the driving portion can be reduced, and the structure can be simplified, thereby simplifying the machining procedure, reducing the machining difficulty, and reducing the manufacturing cost of the electronic expansion valve. Furthermore, a channel formed by the end of the driving portion and the cavity in the pressing sleeve 22 together, the accommodating cavity of the valve head 21, and a through hole 211 of the valve head 21 form a balancing channel penetrating the valve head portion, so that pressure balance can be maintained in regions at two ends of the valve head portion, and the size of the product can be made smaller. By providing a balancing channel, the fluid pressures in the regions at the two ends of the valve head portion can be consistent, and in this way, after the valve head portion blocks the valve port 11, it can be avoided that the blocking is not tight enough due to a pressure difference between the two sides of the valve head portion. Moreover, this facilitates opening of the valve port 11.

The electronic expansion valve further comprises a guide sleeve 60 provided in the valve body 10, and the valve head portion is inserted in the guide sleeve 60. The valve head 21 is guided by the guide sleeve 60.

In some embodiments, the electronic expansion valve further comprises a sealing member 80, the sealing member 80 being provided between the valve head portion and the guide sleeve 60. The sealing member 80 can improve the sealing performance to avoid internal leakage. In some embodiments, an inner wall of the guide sleeve 60 is provided with an annular groove, the sealing member 80 which is annular is provided in the annular groove, and an outer wall of the valve head 21 can be sealed by the sealing member 80 which is annular, so as to ensure the sealing performance of the electronic expansion valve.

In some embodiments, a length of the end of the driving portion inserted in the valve head portion is less than or equal to a half of a length of the valve head portion, such that a length of the driving portion can be reduced, facilitating processing.

In some embodiments, the valve head 21 is of a cylindrical shape, and the accommodating cavity is of a circular hole shape, so that the structure of the valve head 21 is simple, being facilitating for processing and assembly with related components.

In the embodiments, the driving portion including a rod 31 and a valve sleeve 32, the rod 31 can axially move, an end of the rod 31 is connected with the valve sleeve 32, the valve sleeve 32 is cooperated with an end of the valve head portion away from the valve port 11, and the other end of the elastic member 40 is abutted against the valve sleeve 32. In this way, the valve sleeve 32 can be driven to move by the movement of the rod 31; when the valve sleeve 32 moves in a direction close to the valve port 11, the valve head portion can be driven to move so as to block the valve port 11; and when the valve sleeve 32 moves in a direction away from the valve port 11, the valve head portion can be driven to move so as to open the valve port 11.

As shown in FIG. 1, the valve sleeve 32 is fixed at an end of the rod 31, the outer peripheral surface of the valve sleeve 32 is provided with a first limiting step, and the other end of the elastic member 40 is abutted against the first limiting step. The elastic member 40 can be positioned and limited by the first limiting step. Furthermore, the valve sleeve 32 can prevent the rod 31 from directly contacting the elastic member 40, thereby reducing a wear of the rod 31. In some embodiments, the valve sleeve 32 is connected with the end of the rod 31 by means of laser welding, which facilitates for processing and firm connection. In some embodiments, the elastic member 40 is configured as a spring.

By means of the above technical solution, structure of the electronic expansion valve can be simplified, an axial size of the driving portion can be reduced, and an overall length of the electronic expansion valve is reduced, so that the structure of the electronic expansion valve is more compact, and the miniaturization is achieved.

In some embodiments, an end of the valve head 21 away from the valve port 11 is provided with an opening, the opening is in communication with the accommodating cavity, the pressing sleeve 22 is provided at the opening, and the valve sleeve 32 is abutted against the pressing sleeve 22. In this way, the valve sleeve 32 can be limited by the pressing sleeve 22, so that the valve sleeve 32 drives the valve head portion to move when moving away from the valve port 11 under the drive of the rod 31.

In some embodiments, a front end of the rod 31 passes through the pressing sleeve 22, an outer circumferential surface of the pressing sleeve 22 has a second limiting step, a part of the pressing sleeve 22 is inserted in the accommodating cavity, and an end surface of the valve head 21 is abutted against the second limiting step. In this way, the pressing sleeve 22 and the valve head 21 can be limited and assembled by means of the second limiting step, thereby facilitating the positioning and assembly of the pressing sleeve 22 and the valve head 21. In some embodiments, the pressure sleeve 22 is connected with the valve head 21 by laser welding, thereby facilitating for operation and firm connection. In some embodiments, the second limiting step includes a narrow part inserted into the accommodating cavity and a wide part abutted against the upper end surface of the valve head 21.

In some embodiments, a first avoiding hole 321 is formed between an inner wall of the valve sleeve 32 and the rod 31, a second avoiding hole 221 is formed between an inner wall of the pressing sleeve 22 and the rod 31, and the first avoiding hole 321 and the second avoiding hole 221 jointly form the channel. The through hole 211, the accommodating cavity, the first avoiding hole 321 and the second avoiding hole 221 are communicated sequentially. In this way, a balancing channel is formed by the through hole 211, the accommodating cavity, the first avoiding hole 321, and the second avoiding hole 221, so that the regions at two ends of the valve head portion are in communication. By means of the above method, holes on the valve sleeve 32 and the pressing sleeve 22 can be used, thereby facilitating processing. In some embodiments, the valve head 21 is cylindrical, and a stepped hole is provided in the valve head 21, a hole with a larger diameter forming the accommodating cavity, and a hole with a smaller diameter forming the through hole 211. By means of this method, the structure of the valve head 21 can be simplified, and the components such as the valve sleeve 32 and the pressing sleeve 22 are also easy to process and assemble.

In some embodiments, the rod 31 includes a first rod section 311 and a second rod section 312 which are connected with each other, and in an axial direction, a cross-sectional area of the second rod section 312 is smaller than a cross-sectional area of the first rod section 311. In some embodiments, a cross section of the first rod section 311 in the axial direction is circular, the second rod section 312 is partly cut off on the basis of the first rod section 311, the cross section of the second rod section 312 in the axial direction is arcuate, the second rod section 312 is inserted in the pressing sleeve 22 and the valve sleeve 32, the first avoiding hole 321 is formed between the inner wall of the valve sleeve 32 and the second rod section 312, and the second avoiding hole 221 is formed between the inner wall of the pressing sleeve 22 and the second rod section 312. During processing, an integrally formed rod is used as the rod 31, and a part of the rod 31 is cut off in the axial direction from an end of the rod 31 to make the second rod section 312, which facilitates processing and has a low manufacturing cost.

In other embodiments that are not shown, the cross section of the second rod section 312 is a fan or other irregular pattern of any area, preferably smaller than the cross section of the first rod section 311. In some embodiments, the cross-sectional area of the second rod section 312 is greater than the cross-sectional area of the first rod section 311, and the purpose of this solution is achieved as long as gaps are formed between the second rod section 312 and the pressing sleeve 22 and the valve sleeve 32.

In some embodiments, a lower end of the second rod section 312 is provided with a third limiting step, an end surface of the third limiting step is flush with an end surface of the pressing sleeve 22, and an end surface of the valve sleeve 32 is abutted against the end surface of the third limiting step. This facilitates the positioning and assembly of the second rod section 312, the pressing sleeve 22 and the valve sleeve 32. The valve sleeve 32 is fixedly mounted on the third limiting step and moves along with the movement of the rod 31. When the valve sleeve 32 moves upwards to a position of the pressing sleeve 22, the valve sleeve 32 can drive the valve head 21 fixed to the pressing sleeve 22 to move upwards together, so as to open the valve port 11.

In some embodiments, the radial cross section of the second rod section 312 is arcuate. In this way, the processing of the second rod section 312 is facilitated, and in order to ensure the structural strength of the second rod section 312, the radial cross section of the second rod section 312 is set to be a major arc shape.

In some embodiments, the driving portion has an external thread, and the electronic expansion valve further includes a nut assembly 50, the nut assembly 50 having an internal thread, the external thread being fitted with the internal thread. In some embodiments, the electronic expansion valve further includes a magnetic rotor, the magnetic rotor can drive the driving portion to rotate, and the driving portion can be axially moved by the threaded fit of the driving portion and the nut assembly 50, thereby driving the valve head to move. In some embodiments, the external thread is located on the rod 31.

As shown in FIG. 3, the region between the guide sleeve 60, the rod 31, the pressing sleeve 22 and the nut assembly 50 is a first cavity 71, the part of the hole where the valve port 11 is located below the valve head 21 is a second cavity 72, and the first cavity 71 is in communication with the second cavity 72 by means of the through hole 211, the accommodating cavity, the first avoiding hole 321 and the second avoiding hole 221.

The foregoing descriptions are merely exemplary embodiments of the present disclosure, but are not intended to limit the present disclosure. For a person skilled in the art, the present disclosure may have various modifications and variations. Any modifications, equivalent replacements, improvements and the like made within the spirit and principle of the present disclosure shall belong to the scope of protection of the present disclosure.

What is claimed is:

1. An electronic expansion valve, wherein the electronic expansion valve comprises:
   a valve body, the valve body having a valve port;
   a valve head portion, movably provided in the valve body, the valve head portion comprising a valve head and a pressing sleeve, the valve head having an accommodating cavity, an end of the accommodating cavity close to the valve port having a bottom wall, a through hole being provided on the bottom wall, and the valve head being used for blocking the valve port;
   a guide sleeve, provided in the valve body, the valve head portion being inserted in the guide sleeve;
   a driving portion, movably provided in the valve body, an end of the driving portion penetrating the pressing sleeve, and a channel being provided on the end of the driving portion and the pressing sleeve; the channel, the accommodating cavity and the through hole together forming a balancing channel penetrating the valve head portion;
   an elastic member, provided in the accommodating cavity, one end of the elastic member being cooperated with the bottom wall, and the other end of the elastic member being able to be compressed by the end of the driving portion; and
   a sealing member, the sealing member being provided between the valve head portion and the guide sleeve.

2. The electronic expansion valve according to claim 1, wherein the driving portion comprises a rod and a valve sleeve, the rod is axially movable, an end of the rod is connected with the valve sleeve, the valve sleeve is cooperated with an end of the valve head portion away from the valve port, and the other end of the elastic member is abutted against the valve sleeve.

3. The electronic expansion valve according to claim 2, wherein the valve sleeve is fixed at the end of the rod, an outer peripheral surface of the valve sleeve is provided with a first limiting step, and the other end of the elastic member is abutted against the first limiting step.

4. The electronic expansion valve according to claim 3, wherein a length of the end of the driving portion inserted into the valve head portion is less than or equal to a half of a length of the valve head portion.

5. The electronic expansion valve according to claim 2, wherein an end of the valve head away from the valve port has an opening, the opening is in communication with the accommodating cavity, the pressing sleeve is provided at the opening, and the valve sleeve is abutted against the pressing sleeve.

6. The electronic expansion valve according to claim 5, wherein the rod passes through the pressing sleeve, an outer circumferential surface of the pressing sleeve has a second limiting step, a part of the pressing sleeve is inserted in the accommodating cavity, and an end surface of the valve head is abutted against the second limiting step.

7. The electronic expansion valve according to claim 6, wherein a length of the end of the driving portion inserted into the valve head portion is less than or equal to a half of a length of the valve head portion.

8. The electronic expansion valve according to claim 5, wherein a length of the end of the driving portion inserted into the valve head portion is less than or equal to a half of a length of the valve head portion.

9. The electronic expansion valve according to claim 2, wherein a first avoiding hole is provided between an inner wall of the valve sleeve and the rod, a second avoiding hole is provided between an inner wall of the pressing sleeve and the rod, the first avoiding hole and the second avoiding hole form the channel, and the through hole, the accommodating cavity, the first avoiding hole and the second avoiding hole are communicated sequentially.

10. The electronic expansion valve according to claim 9, wherein the rod comprises a first rod section and a second rod section which are connected with each other, a cross-sectional area of the second rod section is less than a cross-sectional area of the first rod section, the second rod section is disposed into the pressing sleeve and the valve sleeve in a penetration manner, the first avoiding hole is provided between the second rod section and the inner wall of the valve sleeve, and the second avoiding hole is provided between the second rod section and the inner wall of the pressing sleeve.

11. The electronic expansion valve according to claim 10, wherein the second rod section has a radial cross-section, and the radial cross-section is arcuate.

12. The electronic expansion valve according to claim 11, wherein a length of the end of the driving portion inserted into the valve head portion is less than or equal to a half of a length of the valve head portion.

13. The electronic expansion valve according to claim 10, wherein a length of the end of the driving portion inserted into the valve head portion is less than or equal to a half of a length of the valve head portion.

14. The electronic expansion valve according to claim 9, wherein a length of the end of the driving portion inserted into the valve head portion is less than or equal to a half of a length of the valve head portion.

15. The electronic expansion valve according to claim 2, wherein a length of the end of the driving portion inserted into the valve head portion is less than or equal to a half of a length of the valve head portion.

16. The electronic expansion valve according to claim 1, wherein the driving portion has an external thread, and the electronic expansion valve further comprises: a nut assembly, the nut assembly having an internal thread, the external thread being fitted with the internal thread.

17. The electronic expansion valve according to claim 16, wherein a length of the end of the driving portion inserted into the valve head portion is less than or equal to a half of a length of the valve head portion.

18. The electronic expansion valve according to claim 1, wherein a length of the end of the driving portion inserted into the valve head portion is less than or equal to a half of a length of the valve head portion.

* * * * *